United States Patent [19]

Moore et al.

[11] Patent Number: 4,508,206

[45] Date of Patent: Apr. 2, 1985

[54] CONVEYOR AND SORTING SWITCH

[75] Inventors: John W. Moore, Dallas; William M. Thomas, Garland, both of Tex.

[73] Assignee: Stewart Systems, Inc., Plano, Tex.

[21] Appl. No.: 445,015

[22] Filed: Nov. 29, 1982

[51] Int. Cl.³ .............................................. B65G 47/46
[52] U.S. Cl. .................................... 198/365; 198/449
[58] Field of Search ............... 198/349, 365, 802, 779, 198/437, 440, 449

[56] References Cited

U.S. PATENT DOCUMENTS

| 3,093,245 | 6/1963 | Worcester et al. | 198/437 X |
| 3,608,698 | 9/1971 | Crall | 198/802 X |
| 3,735,867 | 5/1973 | Vanderhoof et al. | 198/367 X |
| 3,770,100 | 11/1973 | McCaul | 198/365 X |
| 3,780,850 | 12/1973 | McSwiggin | 198/802 |
| 3,987,888 | 10/1976 | Wickam | 198/365 X |
| 4,143,752 | 3/1979 | Del Rosso | 198/365 |

Primary Examiner—Joseph E. Valenza
Assistant Examiner—Jonathan D. Holmes
Attorney, Agent, or Firm—Michael A. O'Neil

[57] ABSTRACT

A sorting switch comprising a plurality of pallet support members mounted for movement around a course including an upper article sorting portion comprising spaced, parallel article conveying paths. Pallets are slidably supported on the pallet support members and have switch engaging members depending therefrom. Switching mechanisms are provided for selectively allowing each pallet to remain aligned with the article conveying path normal thereto or for diverting the pallet into alignment with the opposite article conveying path. The pallets are alternately arranged with each pallet that is normally aligned with one of the article sorting paths being followed by a pallet that is normally aligned with the other article sorting path, and vice versa.

13 Claims, 16 Drawing Figures

CONVEYOR AND SORTING SWITCH

TECHNICAL FIELD

This invention relates to a sorting switch, and more particularly to a horizontal switch for receiving articles from either or both of two input conveyors and for selectively directing the articles to either or both of two output conveyors.

BACKGROUND AND SUMMARY OF THE INVENTION

In the art of article handling, various types of sorting switches have been provided heretofore. For example, switches have been provided for receiving articles from two or more input conveyors and for converging the articles, so that all the articles are directed to a single output conveyor. Other switches have been designed to receive articles from a single input conveyor and to divert the articles so that the articles are selectively directed to one of two or more output conveyors. Still other sorting switches have operated to receive articles from a pair of input conveyors and to direct articles to a pair of corresponding output conveyors while selectively combining certain articles by directing them to a third output conveyor.

In an attempt to provide a single sorting switch capable of performing many of the functions of the aforementioned switches, the switch described and claimed in U.S. Pat. No. 3,987,888, issued Oct. 26, 1976 to I. E. Wickam and assigned to the assignee hereof, was developed. This switch is capable of receiving articles from two input conveyors and selectively directing the articles to either of two output conveyors and therefore constitutes an important contribution to the art of sorting switches. In Wickam, a plurality of pallets are mounted for movement around a course including an upper sorting portion and a lower return portion. The upper sorting portion of the course defines a pair of parallel article conveying paths, and alternate sets of pallets are normally aligned with opposite article sorting paths. Switching of an article from one conveying path to the other can only be accomplished by the lateral movement of the set of pallets on which the article is supported. Since delivery of the articles to the sorting switch must coincide with the alternate positioning of the sets of pallets, the sorting switch of Wickam requires sensing or timing means associated with the input conveyors to deliver each article to a set of pallets on the sorting switch.

The present invention provides numerous advantages in addition to those of the sorting switches of the prior art. For example, one such advantage is that it is unnecessary to deliver articles to the sorting switch of the present invention in a particular sequence when the device is operated in the straight through mode. Another advantage is that the present invention provides a sorting switch capable of use with articles of varying sizes and shapes. Still another advantage of the present invention is the substantial increase in its transporting capacity in terms of the quantity and weight of articles handled thereby. These and other advantages deriving from the use of the invention will readily suggest themselves to those skilled in the art.

In accordance with the broader aspects of the invention, a plurality of pallets are mounted for movement around a course including an upper sorting portion and a lower return portion. The upper sorting portion of the course defines a pair of parallel article conveying paths, and the pallents are normally aligned, in alternating sequence, with opposite article sorting paths. Switch apparatus is provided for selectively allowing a predetermined pallet to follow its normal article sorting path or for diverting the pallet into alignment with the opposite article sorting path. Structure is provided on the return portion of the course for returning all the pallets to their normal orientation relative to the course.

In accordance with more specific aspects of the invention, the pallets are slidably supported on a pair of tubular pallet support members. Each pallet has a switch engaging member depending therefrom. The structure for returning the pallets to their normal orientation relative to the course comprises camming apparatus which engages the switch engaging members of the pallets during movement thereof along the return portion of the course.

The switching apparatus comprises a pair of switching mechanisms mounted on opposite sides of the upper article sorting portion of the course. Each switching mechanism includes a stationary input channel for receiving the switch engaging member of the pallet aligned with one of the article conveying paths. The input channel directs the switch engaging members to a switching channel which is mounted for pivotal movement between a position in which the switch engaging members and the pallets connected thereto are directed along the normal article conveying path and a position in which the switch engaging members and the pallets connected thereto are diverted to the opposite article conveying path. The input channel and the switching channel of each switching mechanism are so arranged that the adjacent ends thereof are aligned regardless of the positioning of the switching channel. Camming structure is provided for receiving the switch engaging members from the switching channel and for directing the switch engaging members and the pallets connected thereto either along the normal article conveying path or into alignment with the opposite article conveying path.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
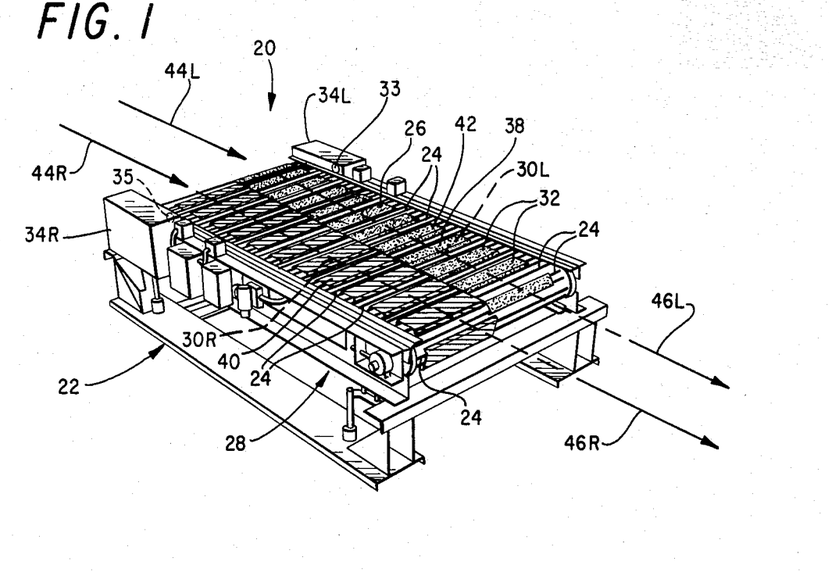
FIG. 1 is a perspective view of a sorting switch incorporating the invention.

Referring now to the Drawings, and particularly to FIG. 1 thereof, there is shown a sorting switch 20 incorporating the present invention. The sorting switch 20 includes a frame 22 which may be of any desired configuration. Preferably, however, the frame 22 is formed from steel and is designed to impart substantial structural rigidity to the sorting switch 20. The frame 22 is adapted for support either on a suitable floor, or from above.

A plurality of pallet support members 24 are mounted on the frame 22 for movement around a closed course including an upper article sorting portion 26 and a lower return portion 28. The upper article sorting portion 26 of the course is divided into spaced, parallel article conveying paths 30L and 30R. Each of the pallet support members 24 extends across both of the article conveying paths 30L and 30R.

The sorting switch 20 further comprises a plurality of pallets 32 each slidably supported by the pallet support members 24. The pallets 32 are normally aligned in alternating sequence with article conveying paths 30L and 30R. Therefore, each pallet is aligned with a conveying path opposite that of the pallet which immediately precedes it. For example, pallet 38 is normally aligned with the article conveying path 30L, pallet 40 is normally aligned with the article conveying path 30R, and pallet 42 is normally aligned with the article conveying path 30L. In the operation of the sorting switch 20, each pallet is either allowed to remain aligned with its normal article conveying path 30L or 30R, or is selectively diverted into alignment with the opposite article conveying path, in this case 30R or 30L.

In the use of the sorting switch 20, articles are received from a pair of input conveyors illustrated in FIG. 1 by the arrows 44L and 44R and are selectively delivered to a pair of output conveyors illustrated in FIG. 1 by the arrows 46L and 46R. Articles are received from the input conveyors in any order, including a random, close-packed sequence and an alternating sequence such that no article is positioned laterally adjacent another article. The ability of the present invention to transport articles in a random, close-packed sequence along either of article conveying paths 30L or 30R allows sorting switch 20 to operate at the same maximum capacity as input conveyors 44L and 44R. The present invention is also capable of performing converging, and selecting functions on articles when so desired.

Assuming that an article is received from the input conveyor represented by the arrow 44R, if the pallets on which the article rests are allowed to remain in alignment with the conveying path 30R the article is delivered to the output conveyor represented by the arrow 46R. On the other hand, if the pallets on which the article rests are diverted into alignment with the conveying path 30L, the article is delivered to the output conveyor represented by the arrow 46L. Conversely, articles received from the input conveyor represented by the arrow 44L are either delivered to the output conveyor represented by the arrow 46L, or the output conveyor represented by the arrow 46R, depending on whether the pallets on which the article rests remain aligned with the article conveying path or are diverted into alignment with the opposite article conveying path. Those skilled in the art will appreciate the fact that the sorting switch 20 may also be used to receive articles from a single input path and to selectively deliver the articles to either of the two output paths. Another use of the sorting switch is to receive articles from both of the input paths and to selectively deliver any of the articles to either of the two output paths. Still another use of the sorting switch 20 is to receive articles from both of the input paths and to deliver all of the articles to a single output path. Yet another use of the sorting switch 20 is to select a particular article in one conveying path and divert it to the other conveying path.

In operation of the sorting switch 20, the pallets which are to be diverted out of alignment with their normal article conveying path into alignment with the opposite article conveying path are progressively moved across the width of the upper article sorting portion of the course of the pallet support members. The progressive movement of the pallets is quite gentle in nature, so that the contents of the article being conveyed are not damaged in any way.

Figure 2:
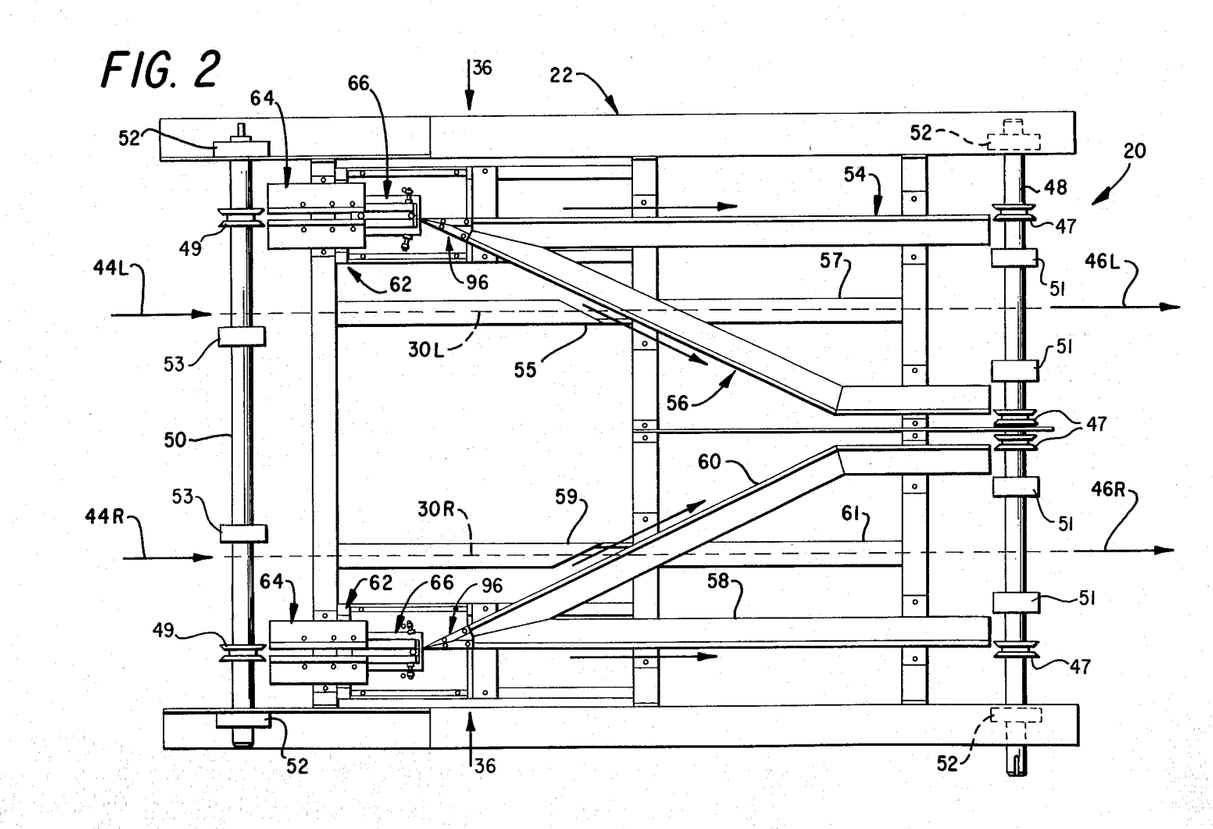
FIG. 2 is a top view of the frame and the switching apparatus of the sorting switch of FIG. 1.

Referring now to FIG. 2, there is shown the portion of the frame 22 of the sorting switch 20 corresponding to the upper article sorting portion of the course of the pallet support members 24. The course of the pallet support members 24 is defined by a pair of axles 48 and 50 which are supported on the frame 22 by bearings 52 for rotation about spaced, parallel axes. The frame 22 includes a camming member 54 indicative of the path of travel of pallets which are initially aligned with the article conveying path 30L and which remain in alignment therewith as they traverse the upper article sorting portion 26 of the course of the pallet support members. A camming member 56 is indicative of the path of travel of pallets which are initially aligned with the article conveying path 30L but which are diverted into alignment with the article conveying path 30R. Similarly, a camming member 58 is indicative of the path of pallets which are initially aligned with the article conveying path 30R and which remain in alignment therewith, and a camming member 60 is indicative of the path of travel of pallets which are initially aligned with the article conveying course and which are diverted into alignment with the article conveying course 30L.

Support members 55, 57, 59, and 61 are aligned with conveying paths 30L and 30R for providing additional support to pallets 32. The undersides of pallets 32 slidably contact, and are partially supported by, the upper surfaces of support members 55, 57, 59, and 61 during operation of switch 20. A space is provided between support members 55 and 59 and camming members 56 and 60, respectively, so as not to interfere with the movement of switch engaging members, which depend from the pallets 32, along the surfaces of camming members 56 and 60 during operation of switch 20. In addition to support members 55, 57, 59 and 61, support wheels 51 and 53 provide additional support for pallets 32 during their movement about axles 48 and 50, respectively. Support wheels 51 and 53 are affixed to their respective axles at spaced-apart locations and rotate synchronously therewith. The undersides of pallets 32 will contact support wheels 51 and 53 as pallets 32 are moved between the upper sorting portion and the lower return portion of sorting switch 20.

The sorting switch 20 further includes dual switch apparatus 62 mounted on opposite sides of the upper article sorting portion 26 of the course of the pallet supporting members 24. Each switch apparatus 62 includes a stationary input channel 64 which receives the switch engaging members. The input channels 64 direct the switch engaging members of the pallets to pivotally supported switching channels 66. The switching channels 66 are selectively positioned to direct the switch engaging members either into engagement with the camming member 54 or into engagement with the camming member 56, or into engagement with the camming member 58 or into engagement the camming member 60, depending on the positioning of the dual switch apparatus 62. By this means the pallets are selectively directed either along the article conveying path normal thereto or are diverted into alignment with the opposite article conveying path.

Sorting switch 20 is provided with guide wheels 47 and 49 which serve to engage the switch engaging members of the pallets as the pallets move about respective axles 48 and 50. Each of guide wheels 47 and 49 has a guide groove about its perimeter which is suitable for receiving the switch engaging members. Guide wheels 49 are affixed to axle 50 such that their guide grooves are aligned with input channels 64. In similar fashion, guide wheels 47 are affixed to axle 48 such that their guide grooves are aligned with the camming surfaces of camming members 54, 56, 58 and 60. During the operation of switch 20, as the pallets are moved from the lower return portion to the upper sorting portion of sorting switch 20 the switch engaging members of the pallets will be maintained in proper alignment for their introduction into input channel 64 by guide wheels 49. As the pallets approach the end of the upper sorting portion, their switch engaging members will be aligned with the camming surfaces of camming members 54, 56, 58 or 60. As the pallets are moved from the end of the upper sorting portion to the lower return portion, their switch engaging members will engage the grooves of guide wheels 47, thereby retaining their alignment with respect to the camming surfaces.

Figures 3, 10:
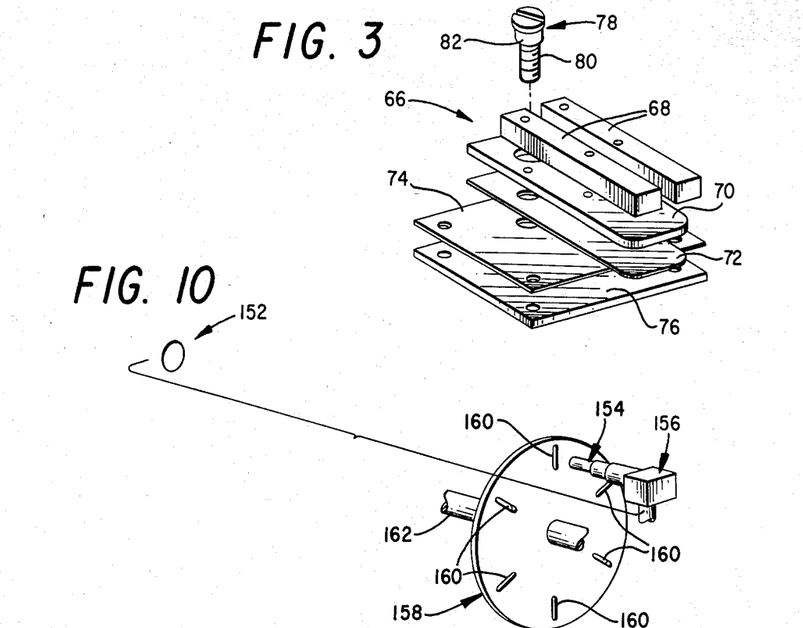
FIG. 3 is an exploded view of a portion of the switching apparatus.
FIG. 10 is an illustration of a portion of the switching control apparatus of the sorting switch comprising a synchronizing photoeye.

The switching channels 66 of the dual switch apparatus 62 is better illustrated in FIG. 3. A pair of diverter bars 68 are secured to a diverter plate 70 by means of suitable fasteners. The diverter bars 68 define a switch engaging member receiving channel therebetween. A layer of low friction material 72 is adhesively secured to the underside of the diverter plate 70. Another layer of low friction material 74 is secured to a support plate 76 by means of suitable fasteners. The diverter plate 70 and therefore the diverter bars 68 are rotatably secured to the support plate 76 by diverter post 78. The diverter post 78 includes a lower threaded portion 80 which is received in the support plate 76 and an upper bearing portion 82 which is received in the diverter plate 70. It will thus be understood that the switching channel 66 defines a switch engaging member receiving channel which is supported for pivotal movement about an axis defined by the diverter post 78. Due to the use of the layers of the low friction material 72 and 74, the frictional resistance of such pivotal movement is quite low.

Figure 4:
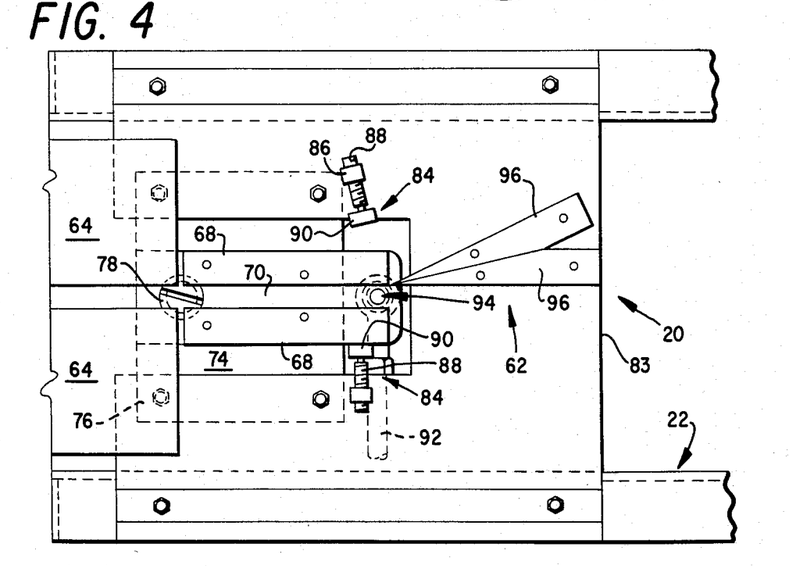
FIG. 4 is a further illustration of the switching apparatus of the sorting switch of FIG. 1.

The overall structure of the switching apparatus 62 of the sorting switch 20 is further illustrated in FIG. 4. The component parts of the switching apparatus are supported on a base plate 83 which is in turn secured to the frame 22. The axis of pivotable movement of the diverter plate 70 and the diverter bars 68 carried thereby, as defined by the diverter post 78, is coincident with the entry end of the channel defined by the diverter bars 68. Therefore, the switching channels 66 are adapted to receive the switch engaging member depending from a pallet regardless of its pivotal positioning.

The limits of pivotal movement of the switching channel 66 are defined by a pair of stops 84. Each stop 84 includes a base 86 which is secured to the base plate 83, a threaded rod 88 which threadedly engages the base 86, and a diverter bar engaging stop 90 which is supported on the distal end of the threaded rod 88. The positioning of the stop 90 and, therefore, the limits of pivotal movement of the switching channel 66 are determined by selectively rotating the threaded rod 88 of a particular stop 84 relative to the base 86 thereof.

Each switching channel 66 is selectively pivoted by means of a rod 92 which is pivotally secured to the diverter plate 70 at 94. The rod 92 in turn extends to a suitable actuating mechanism, such as a fluid-powered cylinder. Such actuating mechanism is selectively operated to effect pivoting of the switching channels 66, the limits of the pivoting movement being determined by the stops 84.

FIG. 4 further illustrates a pair of diverter bars 96 which are secured to the base plate 83. The stationary diverter bars 96 comprise the switch engaging member receiving portions of the camming member 58 and the camming member 60 (or the camming member 54 and the camming member 56, as the case may be). It will be noted that the stationary diverter bars 96 mounted on the base plate 83 are adapted to be manufactured from a length of bar stock by cutting the bar stock at an angle of approximately 12.5°.

In the operation of the switching apparatus 62, it is practically impossible for the switch engaging members of the pallets to come into contact with the stationary structure. In the use of the switching apparatus 62, it has been found that the pivotal positioning of the diverter bars 68 may be changed at practically any time, including the time period during which switch engaging members are passing therethrough. Of course, it is undesirable to change the pivotal positioning of the diverter bars 68 when a switch engaging member is aligned with or substantially aligned with the ends of the diverter bars 68 adjacent to the stationary diverter bars 96.

Figure 5:
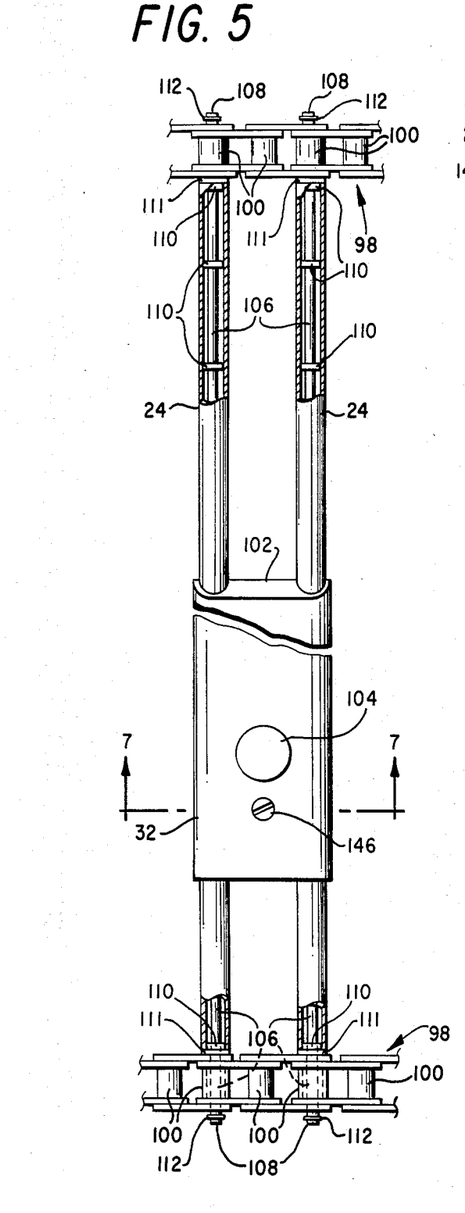
FIG. 5 is an illustration of the pallet support arrangement of the sorting switch of FIG. 1.

Referring now to FIG. 5, the course of the pallet support members 24 of the sorting switch 20 is defined by a pair of drive chains 98 which comprise hollow pin roller chains and which are constrained around sprockets mounted on the axles 48 and 50. Each drive chain 98 comprises a series of interconnected links 100. Each pallet support member 24 is secured at either end thereof to drive chains 98 for movement thereby around the course.

More specifically, each pallet support member 24 is tubular, having apertures at either end thereof. A through rod 106, having ends 108, extends through a pallet support member 24 and through hollow pins of adjacent lengths 100 of each of the drive chains 98. The ends 108 of each through rod 106 receive snap rings 112. A number of annular and preferably plastic spacers 110 are disposed about each through rod 106 along its length for centering each through rod 106 within the pallet support members 24. By this means, rattling of through rods 106 withing pallet support members 24 is prevented. Flanges 111 extend radially from the spacers 110 which are adjacent drive chains 98 and are disposed between the ends of the pallet support members 24 and the drive chains 98, thereby acting as bushings. By these means the opposite ends of each pallet support member 24 are secured to the drive chains 98 for movement thereby around the course.

Figure 6:
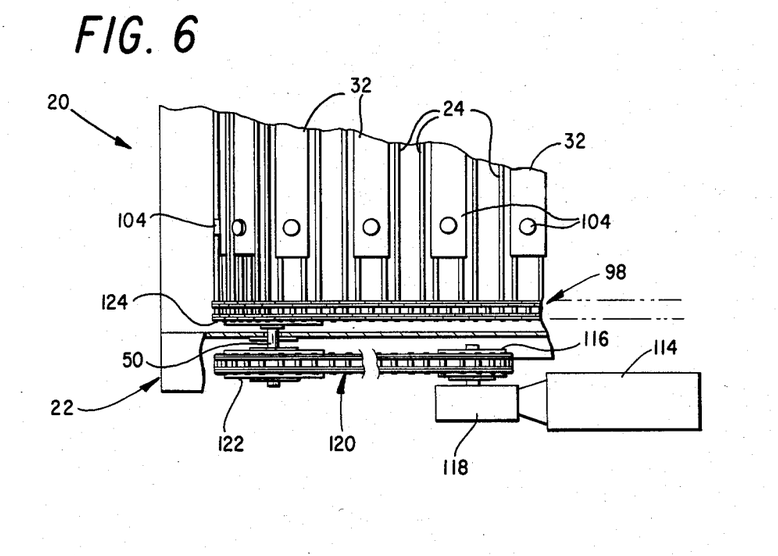
FIG. 6 is an illustration of the drive mechanism of the sorting switch.

The drive mechanism of the sorting switch 20 is illustrated in FIG. 6. An electric motor 114 drives a slip clutch sprocket 116 through a gear box 118. A drive chain 120 is constrained around the slip clutch sprocket 116 and a sprocket 122 mounted on the axle 50. The axle 50 also supports sprockets 124 which receive the drive chains 98. In this manner the motor 114 operates through the gear box 118, the sprocket 116, the slip clutch sprocket 122, the axle 50, and the sprockets 124 to drive the drive chains 98 and thereby move the pallet support members 24 around the course.

Figure 7:
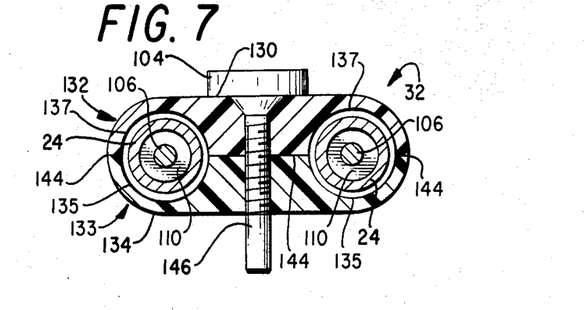
FIG. 7 is a sectional view taken generally along the line 7—7 of FIG. 5 in the direction indicated by the arrows.

Referring to FIG. 7, the positioning of pallet support members 24 with respect to pallet 32 is illustrated more particularly. The tubular pallet support members 24 are each received by a channel defined by semi-circular grooves 137 and 135 which run longitudinally along respective mating surfaces of the upper half 132 and the lower half 133 of pallet 24. The diameter of the channel formed by grooves 137 and 135 is sufficient to slideably accommodate a pallet support member 24. A switch engaging member 146 extends through the upper half 132 and the lower half 133 of the pallet 32 and depends therefrom for engagement with the switching apparatus and the camming members of a sorting switch employing the pallet 32. The switch engaging member 146 has a threaded upper portion which is threadedly engaged with the pallet 32. Each switch engaging member 146 is secured near the end of each pallet 32 which is closest to a drive chain 98 when the pallet 32 is normally aligned with respect to the sorting switch 20.

Each pair of pallet support members 24 support a single pallet 32. The pallets 32 are preferably formed of a suitable plastic material having good wear resistance, and may advantageously comprise plastic extrusions. For example, the pallets 32 may comprise ultra-high molecular weight polyethylene. Each pallet 32 comprises an upper half 132 and a lower half 133. The upper half 132 has a flat upper surface 130 and opposite edges which curve downwardly towards seam 144. Similarly, the lower half 133 has a flat lower surface 134 and opposite edges which curve upwardly toward seam 144. The mating faces of upper and lower halves 132 and 133 are flat and define seam 144. Upper and lower halves 132 and 133 of pallet 32 each have a pair of semi-circular grooves 137 and 135 which run longitudinally along their respective mating faces. The diameters of and the spacing between grooves 137 and 135 are such that when upper and lower halves 132 and 133 of pallet 32 are mated, a pair of longitudinal channels of suitable diameter to slideably receive an adjacent pair of pallet support members are defined thereby. The upper and lower halves 132 and 133 of pallet 32 may be bonded together in their mated relationship by suitable means such as adhesive or by threadably receiving the threaded upper portion of switch engaging member 146, for example.

A cylindrical bumper 104 is affixed by appropriate means to the upper surface 130 of pallet 32 close to the end of pallet 32 which is normally adjacent a drive chain 98, as shown in FIG. 5. During operation of switch 20, bumper 104 serves to push the edge of an article against frictional resistance which may be encountered as the article is diverted to the adjacent conveying path. Such resistance may be caused by contact between the article and the pallets over which the article must slide. To further facilitate switching operations, the upper half 132 of pallet 32 features a beveled edge 102 which slopes downwardly toward the lower half 130 of pallet 32, as illustrated in FIG. 5. Beveled edge 102 is located at the end of pallet 32 which is normally furthest from the drive chain 98 to avoid catching the undersides of articles which may be slid over pallet 32 from an adjacent conveying path.

Although the pallet shown in FIG. 7 incorporates a bumper 104 for urging an article towards an adjacent conveying path, those skilled in the art will appreciate that a variety of high friction surfaces are suitable for use instead of bumper 104. The high friction surface might comprise a portion or strip of the upper surface 130 of pallet 32 close to that end of pallet 32 which is normally adjacent a drive chain 98.

Figure 8:
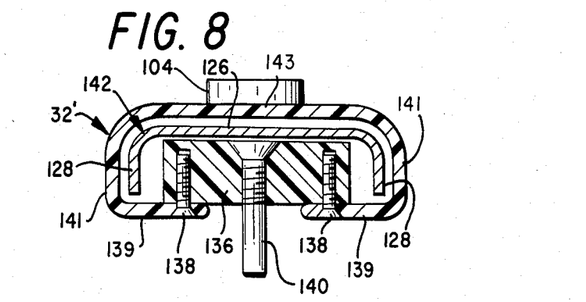
FIG. 8 is a view similar to FIG. 7 showing the pallets of the sorting switch of FIG. 1 mounted on a different type of pallet support structure.

Referring to FIG. 8, it will be seen that a pallet 32' substantially similar to that which is employed in the present invention in conjunction with the pallet support members 24 is adapted for use in sorting switches employing conventional channel-shaped pallet support members 142. Pallet 32' comprises an upper wall or web 143 and a pair of side walls or flanges 141 depending from the opposite edges of the web 143. The flanges 141 in turn extend to a pair of lips 139 which turn inwardly and extend substantially parallel to the web 143. The pallet has an interior configuration that is substantially identical to the exterior surface configuration of the pallet support member. The pallet support members 142 each comprise an upper wall or web 126 and a pair of sidewalls or flanges 128 depending from the opposite edges of the web 126. It has been found that by means off the channel-shaped configuration of the pallet support members 142, the sorting switch 20 is adapted to carry a substantially greater weight per foot of pallet support member length than is the case when a sorting switch is provided with tubular pallet support members.

The pallet 32' is secured in place on the pallet support member 142 by means of a block 136 formed from a conventional bar stock. The block 136 may comprise a length of either conventional metal or a conventional plastic bar stock in accordance with particular requirements. The pallet 32' is secured to the block 136 by means of threaded fasteners 138 extending through the lips 139 of the pallet 32' and into the block 136. A switch engaging member 140 is secured in the block 136 and extends downwardly therefrom for engagement with the switching mechanisms and the camming members of the sorting switch 20. The switch engaging member 140 may be secured in the block 136 by means of a suitable adhesive. Alternatively, the upper portion of the switch engaging member 140 may be adapted for threaded engagement with the block 136.

Figure 9:
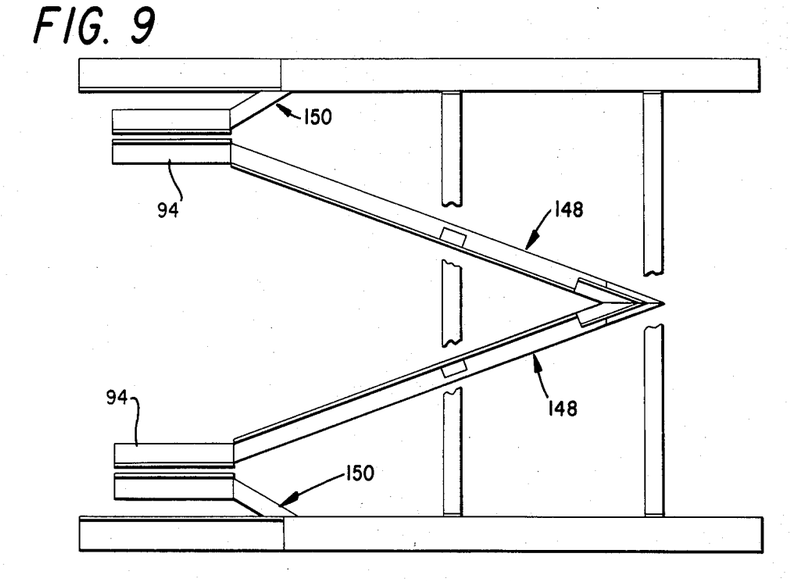
FIG. 9 is an illustration of the return portion of the frame of the sorting switch.

The portion of the frame 22 of the sorting switch 20 comprising the return portion 28 of the course of the pallet support members 24 is illustrated in FIG. 9. The switch engaging members of any pallets which have been diverted out of alignment with the article conveying path normal thereto and into alignment with the opposite article conveying path engage a camming structure 148. The function of the camming structure 148 is to return each pallet to its normal orientation with respect to the course of the pallet support members 24, whereby the switch engaging members of the pallets enter the stationary return channels 94 of the switching apparatus 62. The switch engaging members of pallets which have remained aligned with the article conveying path normal thereto normally remain properly aligned to enter the appropriate return channels 94. However, in the event that one or more of the pallets has become misaligned by any means, camming members 150 are provided for properly aligning the switch engaging members to enter the return channels 94.

Referring to FIG. 10, there is shown a synchronizing photo responsive apparatus which is utilized in sorting switch 20 to permit switching by the appropriate switching apparatus 62 only between pallets rather than under them. A photoeye/sensor 156 has a series of lenses 154 which direct a beam of light towards a reflector 152. The path of the beam of light from photoeye/sensor 156 extends through a pallet positioning wheel 158 and is reflected back to the photoeye/sensor 156 by reflector 152. The wheel 158 is provided with a plurality of slots 160 each indicative of the positioning of the switch engaging member of a pallet. The wheel 158 is supported on a shaft 162 which is rotated in accordance with the movement of the pallets 32 under the action of the drive motor 114. As a slot 160 passes between photoeye/sensor 156 and reflector 152 the photoeye/sensor 156 senses the beam of light reflected by reflector 152, thus indicating the position of a switch engaging member. It will be understood that the wheel 158 may include a different number of slots 160 that is either equal to or is equal to a multiple of the number of pallets in sorting switch 20, depending upon the ratio of the speed of rotation of the wheel 158 to the speed of pallet movement. The synchronizing photo responsive assembly may be conveniently located in either of housings 34L or 34R of the sorting switch 20 shown in FIG. 1.

In addition to the synchronizing function performed by the photo responsive apparatus of FIG. 10, sorting switch 20 is preferably provided with an article detecting photo responsive apparatus. Such an apparatus will ensure that all pallets on which an article rests follow the same path across the upper article sorting portion of sorting switch 20. Accordingly, sorting switch 20 is provided with a photoeye/sensor and a reflector which may be mounted separately in either of housings 34L or 34R of FIG. 1 at the input end of sorting switch 20. The photoeye/sensor and the reflector are positioned directly across from each other immediately above the upper article sorting portion 26 of sorting switch 20 and behind apertures 33 and 35 of housings 34L and 34R, respectively. A beam of light is directed transversely across the upper article sorting portion 26 and is reflected back to the photoeye/sensor by the reflector. The beam of light is therefore broken if an article is positioned in the upper article sorting portion 26 between the photoeye/sensor and the reflector.

Arrows 36 in FIG. 2 designate the preferred positioning of the photoeye/sensor and the reflector with respect to the frame and switching apparatus of sorting switch 20 and hence define the position at which an article will be detected along the upper article sorting path 26. Arrows 36 are disposed along upper article sorting path 26 at a point approximately between diverter bars 96 and camming members 54, 56, 58 and 60. Therefore, the photoeye/sensor will detect the presence of an article soon after the first of the pallets on which the article rests passes the switching channels 66. As long as an article is detected by the photoeye/sensor, the pivotal position of switching channels 66 will remain unchanged, thereby assuring that all pallets which carry an article are directed along the same path during their movement across the upper article sorting portion 26. The synchronizing photo responsive apparatus and the product detecting photo responsive apparatus are connected in series to prevent the switching of switching apparatus 62 as a pallet passes above switching apparatus 62 and to assure that all pallets supporting an article follow the same path across the upper article sorting portion 26 of sorting switch 20.

Figure 11:
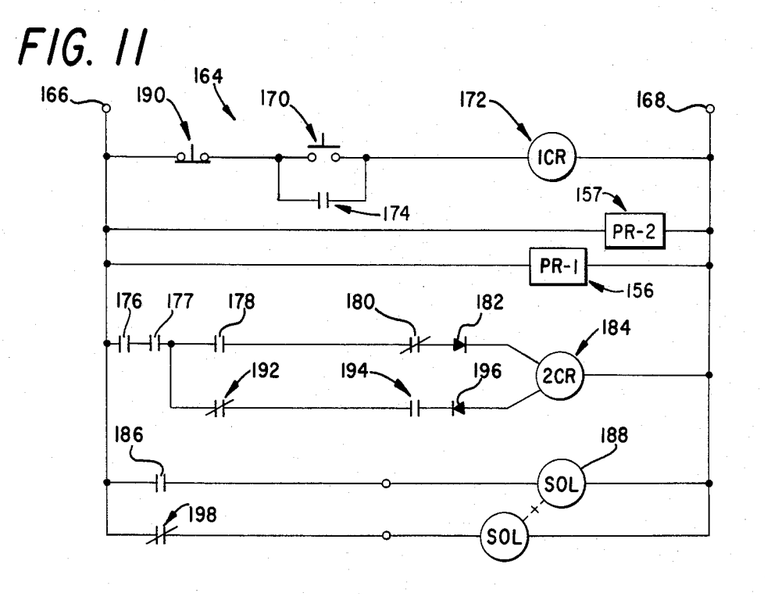
FIG. 11 is a schematic illustration of an electrical control circuit utilized in the sorting switch.

Referring to FIG. 11, the synchronizing photo responsive apparatus of FIG. 10 and the product detecting photo responsive are utilized in conjunction with an electrical control circuit 164. Conventional 115 volt, 60 hz line current is received through a pair of terminals 166 and 168. Each switching apparatus 62 of the sorting switch 20 is normally conditioned to direct the sets of pallets along the article conveying path normal thereto. Whenever it is desired to divert a pallet into alignment with the opposite article conveying path, a switch 170 is closed, whereupon a first control relay 172 is operated, and locks are operated through a normally opened contact pair 174.

The photoeye/sensor 156 of FIG. 10 and the photoeye/sensor 157 of the article detecting photo responsive apparatus are also actuated through the terminals 166 and 168. Whenever the photoeye/sensor 156 receives light, a normally open contact pair 176 is closed. Likewise, whenever the photoeye/sensor 157 of the article detecting photo responsive apparatus receives light, a normally open contact pair 177 is closed. Current is therefore directed through a normally open, now closed contact pair 178 of the control relay 172, a normally closed pair of latching contacts 180, and a diode 182 to operate a second control relay 184 which closes a normally open contact pair 186 to direct operating power to a solenoid 188. The solenoid 188 then operates to pivot the switching channels 66 of the associated switching apparatus 62 from the position which causes the pallets to remain aligned with the article conveying path normal thereto to the position wherein the pallets are diverted into alignment with the opposite article conveying path.

Assume now that it is desired to return the switching apparatus to the configuration in which a particular pallet is allowed to remain aligned with the article conveying path normal thereto. A normally closed switch 190 is opened. This causes the first control relay 172 to drop out, thereby opening a normally closed contact pair 192. Assuming that photoeye/sensors 156 and 157 are receiving light, the second control relay 184 is allowed to deenergize through the contact pair 192, a normally open, now closed latching contact pair 194, and a diode 196. This closes a normally closed contact pair 198, whereby the solenoid 188 is actuated to return the switching apparatus 62 to its original condition.

In FIG. 11, the switches 170 and 190 are indicated as manually actuated switches. While the use of manually actuated switches is a feasible method of operating the sorting switch 20, those skilled in the art will realize that the switches 170 and 190 are readily adapted for automatic actuation. For example, various apparatus may be utilized to actuate the switches 170 and 190 in accordance with size, weight, color, shape, etc. of articles being conveyed. The articles may also be provided with indicia relating to the nature of the contents thereof, in which event suitable reading apparatus may be utilized to operate the switches 170 and 190. Finally, the operation of switches 170 and 190 may be computer controlled, if desired.

Figure 12:
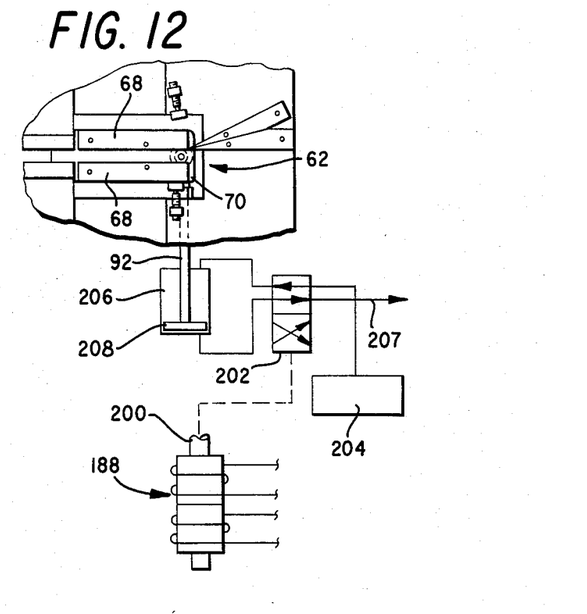
FIG. 12 is an illustration of the switch actuating apparatus of the sorting switch.

The relationship between the electrical control circuit of FIG. 11 and the switching apparatus 62 of the sorting switch 20 is illustrated in FIG. 12. The solenoid 188 is a double-acting solenoid having a core 200. The core 200 of solenoid 188 is connected to a four-way valve 202, whereby actuation of the solenoid 188 results directly in the positioning of the valve 202 in one or the other of its two positions. The valve 202 controls the flow of a pressurized fluid from a source 204 thereof, to the opposite ends of a cylinder 206, to an exhaust port or sump 207. A piston 208 is slidably supported in the cylinder 206 and has a piston rod comprising the rod 92 which is connected to the diverter plate 70 of the switching apparatus 62. It will thus be understood that the operational state of the solenoid 188 and the pivotal positioning of the diverter plate 70 and the diverter bars 68 of the switching apparatus 62 mounted thereon, are directly related.

The various operating modes of the sorting switch 20 are illustrated in FIGS. 13–16, inclusive. Articles traveling along the input paths represented by the arrows 44L and 44R are received by a pair of accumulator conveyors 210L and 210R. A pair of metering conveyors 212L and 212R are utilized to transport individual articles from the accumulator conveyors 210L and 210R to the sorting switch 20. By means of the metering conveyors 212L and 212R, individual article may be transported from the accumulator conveyors 210L and 210R in any sequence desired. Articles passing through the sorting switch 20 are received by a pair of output conveyors 214L and 214R as represented by the arrows 46L and 46R. The accumulator conveyors 210L and 210R, the metering conveyors 212L and 212R, and the output conveyors 214L and 214R may be of any of the commercially available types.

Figure 13:
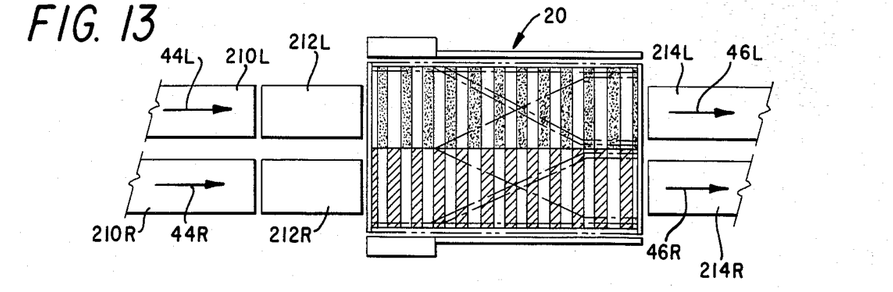
FIGS. 13–16 inclusive are diagrammatic illustrations of various operating modes of the sorting switch.

In FIG. 13, the sorting switch 20 is shown operating in the straight through mode. That is, each article received by the sorting switch 20 from the accumulator conveyor 210L under the action of the metering conveyor 212L is directed to the output conveyor 214L by the pallets of sorting switch 20. Likewise, each article received from the accumulator conveyor 210R under the action of the metering conveyor 212R is directed to the output conveyor 214R by the pallets of sorting switch 20. It is important to note, however, that in the straight through mode the pallets are arranged such that sorting switch 20 will transport even a random order of articles thereacross. This is so because the normal positioning of the pallets provides support for articles of various lengths which may be received by sorting switch 20 at any time interval.

Figure 14:
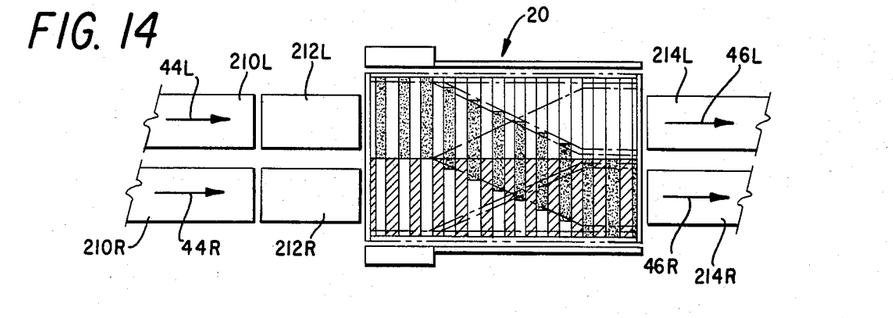

In FIG. 14, the sorting switch 20 is shown operating in a combining mode. That is, articles received both from the accumulator conveyor 210L and from the accumulator conveyor 210R under the action of metering conveyors 212L and 212R are directed to a single output conveyor, in this case the output conveyor 214R. Obviously, all of the articles received from the two input paths can be directed to the output conveyor 214L with equal facility. It is also essential in the combining mode that articles traveling along the adjacent input paths 44L and 44R be properly spaced by suitable means such as metering conveyors 212L and 212R such that articles remaining in the same conveying path do not interfere with the convergence of articles from the adjacent conveying path. Moreover, the combining function can be performed selectively, whereby only certain received articles are combined and the remainder are allowed to follow the article conveying path normal thereto, as in a select mode.

Figure 15:
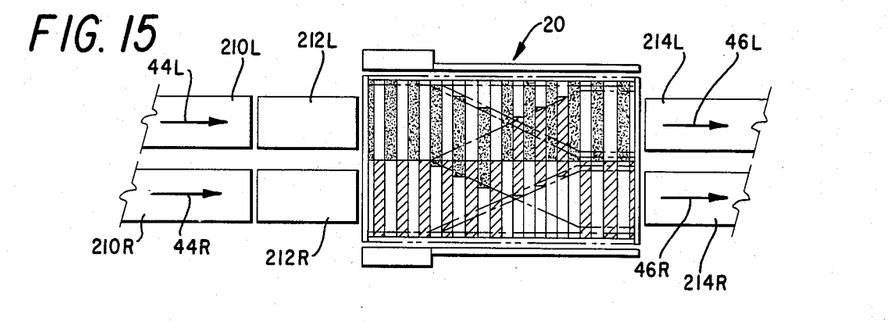

In FIG. 15, the sorting switch is shown operating in the cross-over mode. In this mode, each article received by the sorting switch 20 from the accumulator conveyor 210L under the action of the metering conveyor 212L is delivered to the output conveyor 214R by the pallets comprising the sorting switch 20. Likewise, each article received from the accumulator conveyor 210R under the action of the metering conveyor 212R is directed to the output conveyor 214L. It is necessary in the cross-over mode that adequate space be provided laterally adjacent or next to the article desired to be diverted into alignment with the opposite article conveying path. Therefore, proper positioning of articles with respect to one another on sorting switch 20 is essential for the cross-over operation and may be provided through metering conveyors 212L and 212R. During the cross-over operation, pallets supporting each article are selectively diverted toward the opposite conveying path, thereby effecting a cross-over of articles between the two adjacent conveying paths. Those skilled in the art will appreciate the fact that by means of appropriate control circuitry, the sorting switch can be selectively operated either in the straight through mode illustrated in FIG. 13 or in the cross-over mode illustrated in FIG. 15, thereby performing an article sorting function.

Figure 16:
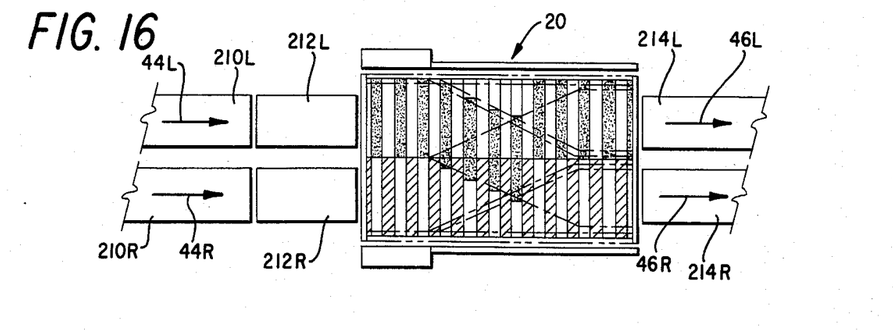

In FIG. 16, the sorting switch 20 is shown operating in a select mode. That is, articles received from an input path, in this case the path including the accumulator conveyor 210L and the metering conveyor 212L, are selectively directed to either of the two output conveyors 214L or 214R. The criteria for selective diversion of the articles may be based on color, size, weight, etc. proper spacing of the articles with respect to one another on adjacent conveying paths is essential in this mode also. The sorting switch 20 may also be operated to divert articles on the basis of the positioning of a particular article in the sequence of articles. For example, every other article can be diverted, etc.

From the foregoing, it will be understood that the present invention comprises a novel sorting switch incorporating numerous advantages over the prior art. One of the primary advantages deriving from the use of the invention involves the fact that by means thereof, it is unnecessary to provide a particular spacing of articles on adjacent conveying paths with respect to one another when the sorting switch is operated in the straight through mode. Thus, the present invention provides a sorting switch capable of transporting articles of various sizes and shapes, ordered in a close-packed random sequence, on adjacent conveying paths, thereby substantially increasing the maximum transporting capacity of a sorting switch with respect to the prior art. Another advantage in the use of the invention involves the fact that by providing a series of pallets aligned in alternating sequence with respect to two adjacent conveying paths, only those pallets which support any particular article need be diverted to transfer the article to the adjacent conveying path. Therefore, the present invention may be used with articles of widely varying lengths, thereby increasing the maximum transporting capacity of the sorting switch even during converging, cross-over, and selecting modes. Still another advantage deriving from the use of the invention involves the fact that by providing support members on top of which the pallets will slide, it is possible to accommodate substantially greater loads in a sorting switch that has been possible heretofore. Still another advantage deriving from the use of the invention involves the fact that the sorting switch may accommodate articles of various lengths, due to the alignment of the pallets during normal movement, so that a single sorting switch may be utilized in a wide variety of applications. Other advantages deriving from the use of the invention will readily suggest themselves to those skilled in the art.

Although preferred embodiments of the invention have been described in the foregoing Detailed Description and illustrated in the accompanying Drawings, it will be understood that the invention is not limited to the embodiments disclosed, but is capable of numerous rearrangements, modifications, and substitutions of parts and elements without departing from the spirit of the invention.

What is claimed:

1. A sorting switch comprising:
   a plurality of pallet support members;
   means for moving said pallet support members sequentially around a predetermined closed course, said closed course including an upper article sorting portion and a lower return portion;
   a plurality of pallets slidably supported on said pallet support members for transverse movement relative to said course between at least two predetermined positions with respect thereto;
   said upper article sorting portion of said closed course comprising first and second adjacent and substantially parallel article conveying paths;
   half of said pallets being normally aligned at the outset of said upper article sorting portion with said first article conveying path and half of said pallets being normally aligned with said second article conveying path;
   each of said pallets that is normally aligned with said first article conveying path being followed by a pallet that is normally aligned with said second article conveying path, and vice versa, wherein at least two successive pallets of each of said first and second article conveying paths support each article introduced to their respective conveying path, thereby maximizing the transport capacity of said switch by allowing simultaneous transport of articles of various sizes and shapes, ordered in a close-packed random sequence, on each of said first and second conveying paths;
   each of said pallets having a switch engaging member depending therefrom;
   stationary input channel means associated with each of said first and second article conveying paths for receiving said switch engaging members of each pallet as said pallets begin movement through said article sorting portion of said course on said pallet support members under the action of said moving means;
   a switching channel means associated with each of said first and second article conveying paths for receiving each switch engaging member from said input channel means and for selectively directing each switch engaging means and said pallet connected thereto into a first and a second direction;
   camming structure for receiving said switch engaging members directed by said switching channel means in said first direction and for directing said switch engaging members and said pallets connected thereto along their respective first or second path of movement through said article sorting portion of said course; and
   camming structure for receiving said switch engaging members directed by said switching channel means in said second direction and for directing said switch engaging members and said pallet connected thereto transversely relative to said article sorting portion of said course and into alignment with the adjacent article conveying path.

2. The sorting switch according to claim 1, further comprising a pallet return means for returning said pallets to their normal alignment with said article conveying paths during the movement of said pallets through said lower return portion of said closed course.

3. The sorting switch according to claim 2, further comprising a plurality of support members for providing additional support to said pallets, said pallets slidably contacting said support members during movement through said upper article sorting portion of said closed course.

4. The sorting switch according to claim 3, wherein each of said pallets is in alignment during its movement through the upper article sorting portion of said closed course with a conveying path opposite that of the immediately preceding pallet.

5. The sorting switch according to claim 4, wherein said pallet return means comprises a camming apparatus which engages the switch engaging members of said pallets.

6. The sorting switch according to claim 5, wherein said support members comprise pairs of elongated and rigid members disposed in alignment with the article conveying paths such that the upper surfaces thereof slidably contact the undersides of said pallets.

7. The sorting switch according to claim 6, wherein each of said pallets comprises an upper and a lower half having mated faces defining a pair of longitudinal channels for slidably receiving an adjacent pair of pallet support members, said upper half having a flat upper surface and opposite edges curving downwardly towards said lower half, each of said pallets supported by an adjacent pair of pallet support members, said pallet support members being tubular and slidably disposed within said longitudinal channels of said pallets.

8. The sorting switch according to claim 6, wherein each of said pallets comprises a relatively wide, substantially flat upper web, a pair of flanges each depending from each edge of said web, and a pair of flanges each extending inwardly from the lower edge of one of said flanges, each of said pallets supported by a channel-shaped pallet support member having a substantially flat upper web and flanges depending from each edge of the web.

9. The sorting switch according to claim 6, further comprising means for regulating the operation of said pivoting means of said switching channel means such that the diversion of a particular article into alignment with an adjacent conveying path is accomplished by only those pallets on which said article rests.

10. The sorting switch according to claim 6, wherein each of said pallets includes a means for urging an article towards an adjacent article conveying path.

11. In a sorting switch of the type including a plurality of pallets each mounted for movement around a closed course and for transverse movement relative to the course to effect article sorting, wherein said closed course includes an upper article sorting portion and a lower pallet return portion, the improvement comprising:

a plurality of tubular pallet support members;

each pair of said pallet support members individually supporting one of said pallets for movement around said course and for transverse movement relative to said course;

means supporting said pallet support members for sequential movement around said closed course;

said pallets normally being positioned in alternating sequence in alignment with adjacent first and second article conveying paths at the outset of movement through said upper article sorting portion of said closed course of movement, wherein at least two successive pallets of each of said first and second article conveying paths support each article introduced to their respective conveying path, such that the carrying capacity of said sorting switch, in terms of the number of articles carried through each of said conveying paths, is maximized by allowing the simultaneous transport of articles ordered in a close-packed random sequence on each of said first and second article conveying paths and such that said sorting switch is suitable for application with articles having widely differing sizes, shapes and lengths; and means for selectively moving each pallet on its respective pallet support members in a direction transverse relative to said upper article sorting portion of said closed course of movement and into alignment with the adjacent article conveying path and into alignment with the adjacent article conveying path during passage thereof through said upper article sorting portion.

12. The improvement according to claim 11, further comprising a means for selectively diverting only those pallets on which an article rests in a direction transverse relative to movement of said course.

13. The improvement according to claim 12, further comprising a plurality of rigid support members disposed for slidable contact with the bottom surfaces of said pallets during the movement of said pallets through the upper portion of said course and for providing additional support to said pallets.

* * * * *